United States Patent
Chen et al.

[19]

[11] Patent Number: 6,030,062
[45] Date of Patent: Feb. 29, 2000

[54] MOUNTING ASSEMBLY FOR ADDITIONAL CAGE FOR PERIPHERALS

[75] Inventors: I-Fee Chen, Chung-Li; Alvin Liu, Taipei Hsien, both of Taiwan

[73] Assignee: Hon Hai Precision Ind. Co., Ltd., Taipei Hsien, Taiwan

[21] Appl. No.: 09/221,763

[22] Filed: Dec. 28, 1998

[30] Foreign Application Priority Data

Jan. 15, 1998 [TW] Taiwan ................................. 87200845

[51] Int. Cl.⁷ ................................................. A47B 97/00
[52] U.S. Cl. ........................................................ 312/223.2
[58] Field of Search ............................. 312/223.1, 223.2, 312/319.1; 361/724, 725, 726, 727, 731, 732, 733, 747; 211/26

[56] References Cited

U.S. PATENT DOCUMENTS

| | | | |
|---|---|---|---|
| 5,138,525 | 8/1992 | Rodriguez | 361/724 X |
| 5,164,886 | 11/1992 | Chang | 361/724 X |
| 5,447,367 | 9/1995 | Wei | 312/223.2 |
| 5,503,472 | 4/1996 | Vu et al. | 312/223.2 |
| 5,584,396 | 12/1996 | Schmitt | 361/727 X |
| 5,588,728 | 12/1996 | Eldridge et al. | 312/223.1 X |
| 5,726,864 | 3/1998 | Copeland et al. | 361/727 X |

*Primary Examiner*—Peter R. Brown
*Assistant Examiner*—James O. Hansen

[57] ABSTRACT

A cage assembly defining a plurality of bays for mounting peripherals therein comprises a built-in cage fixedly secured to a computer housing. The built-in cage includes a bottom face having front and rear edges thereon. At least a retaining lug formed at one of the front and rear edges. An additional cage is removably assembled to the bottom face of the built-in cage. The additional cage forms at least a retaining flap for detachably engaging with one of the first and rear edges, and a retaining tab for retention with the retaining lug of the built-in cage. A latch bracket assembly arranged between the built-in and additional cages includes a latch bracket movably assembled to the bottom face of the built-in cage and a retaining dowel integrally formed on the upper face of the additional cage. Wherein latch bracket is selectively moved between a first position in which the retaining dowel is securely locked, and a second position in which the retaining dowel is released therefrom.

3 Claims, 6 Drawing Sheets

MOUNTING ASSEMBLY FOR ADDITIONAL CAGE FOR PERIPHERALS

FIELD OF THE INVENTION

The present invention relates to a cage assembly, and more particularly to a cage assembly for mounting additional peripherals such as a hard disk drive to a computer housing.

DESCRIPTION OF PRIOR ART

Modern computer housings are installed with a plurality of peripherals, for example a built-in hard disk drive, a floppy disk drive, a detachable hard disk drive, and a CD-ROM, etc. However, a standard cage of the computer housing has limited bays for such devices. As a result, an additional cage is attached to the built-in cage to increase the bays for additional devices.

Taiwan Utility Model Nos. 77203641, 79204336, 79209891, 81205427, 81209653, 81210924, 82212638, 83202773, 83202972, 84203317, 83205126, 84203316 and U.S. Pat No. 5,067,041 disclose pertinent approaches.

However, the connection between a built-in cage and an additional cage is mostly facilitated by means of a screw or rivet which renders the connection and disconnection of the additional cage become difficult and laborious which is inconvenient for both the end user and assembler.

SUMMARY OF THE INVENTION

An objective of the present invention is to provide a cage assembly in which an additional cage is assembled to increase mounting bays for peripherals.

In order to achieve the object set forth, a cage assembly defining a plurality of bays for mounting peripherals therein comprises a built-in cage fixedly secured to a computer housing. The built-in cage includes a bottom face having front and rear edges thereon. At least a retaining lug formed at one of the front and rear edges. An additional cage is removably assembled to the bottom face of the built-in cage. The additional cage forms at least a retaining flap for detachably engaging with one of the first and rear edges, and a retaining tab for retention with the retaining lug of the built-in cage. A latch bracket assembly arranged between the built-in and additional cages includes a latch bracket movably assembled to the bottom face of the built-in cage and a retaining dowel integrally formed on the upper face of the additional cage. Wherein latch bracket is selectively moved between a first position in which the retaining dowel is securely locked, and a second position in which the retaining dowel is released therefrom.

These and additional objects, features, and advantages of the present invention will become apparent after reading the following detailed description of the preferred embodiment of the invention taken in conjunction with the appended drawing.

DETAILED DESCRIPTION OF PREFERRED EMBODIMENT

Figure 1:
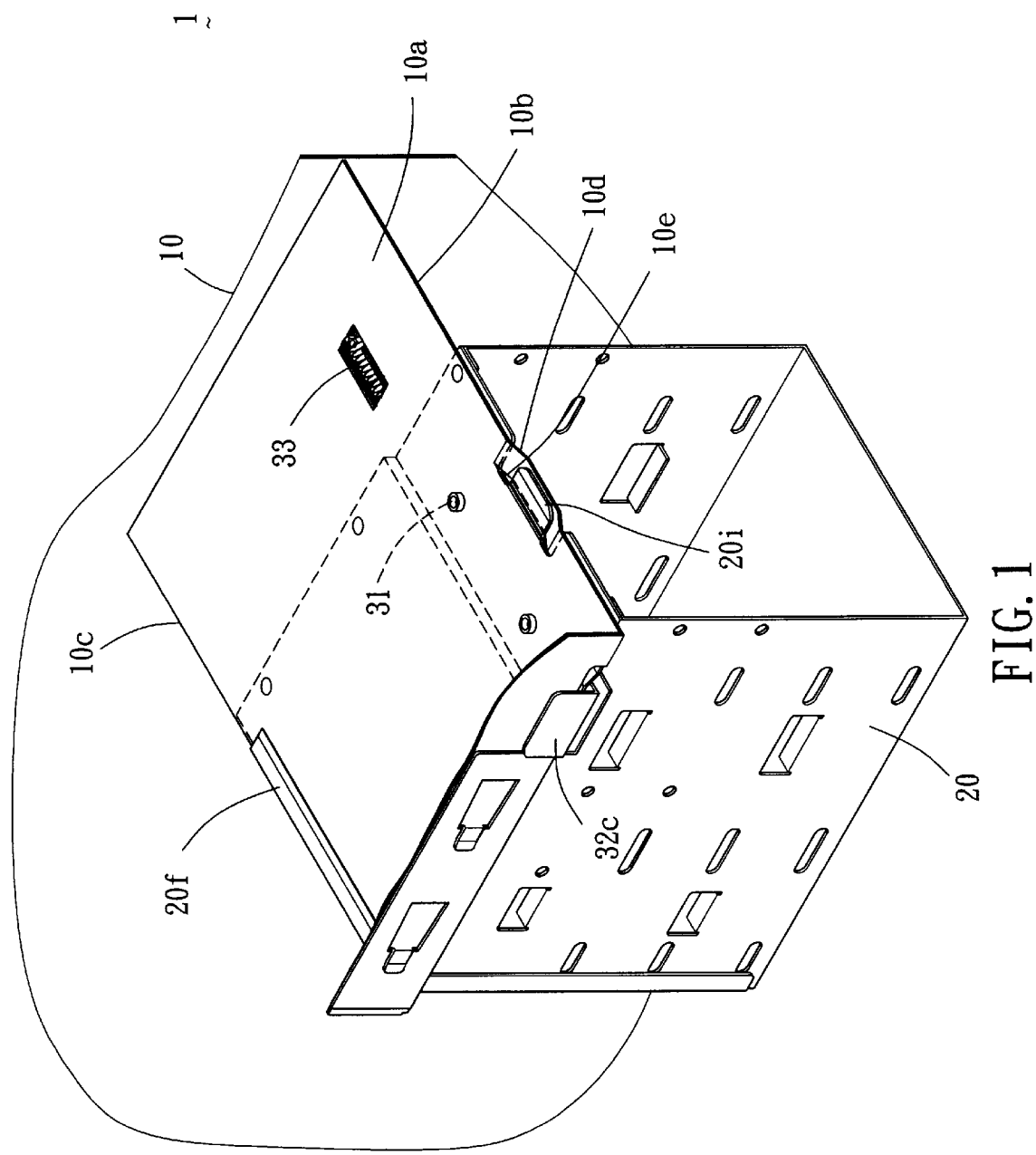
FIG. 1 is a partial, perspective view showing an additional cage attached to a bottom wall of a built-in cage.
Figure 5:
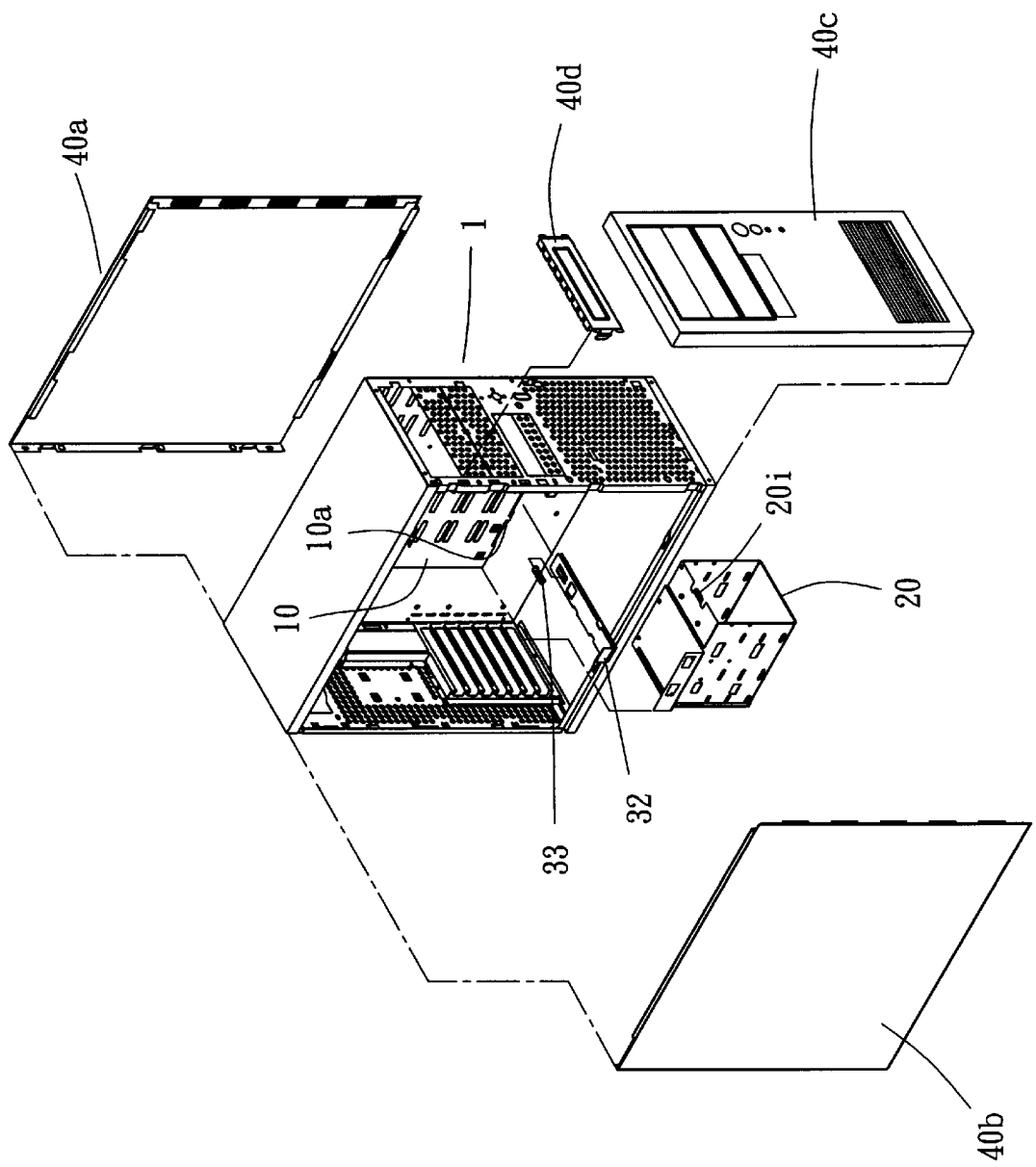
FIG. 5 is a schematic illustration showing the additional cage is attached to the built-in cage of a computer housing by means of the latch bracket assembly.

Referring to FIGS. 1 and 5, a built-in cage 10 of a computer housing 1 for mounting a plurality of peripherals therein forms a bottom wall 10a having a front edge 10b and a rear edge 10c. The front edge 10b forms a retaining lug 10d and an access 10e is defined between the retaining lug 10d and the bottom wall 10a of the built-in cage 10.

Figure 2:
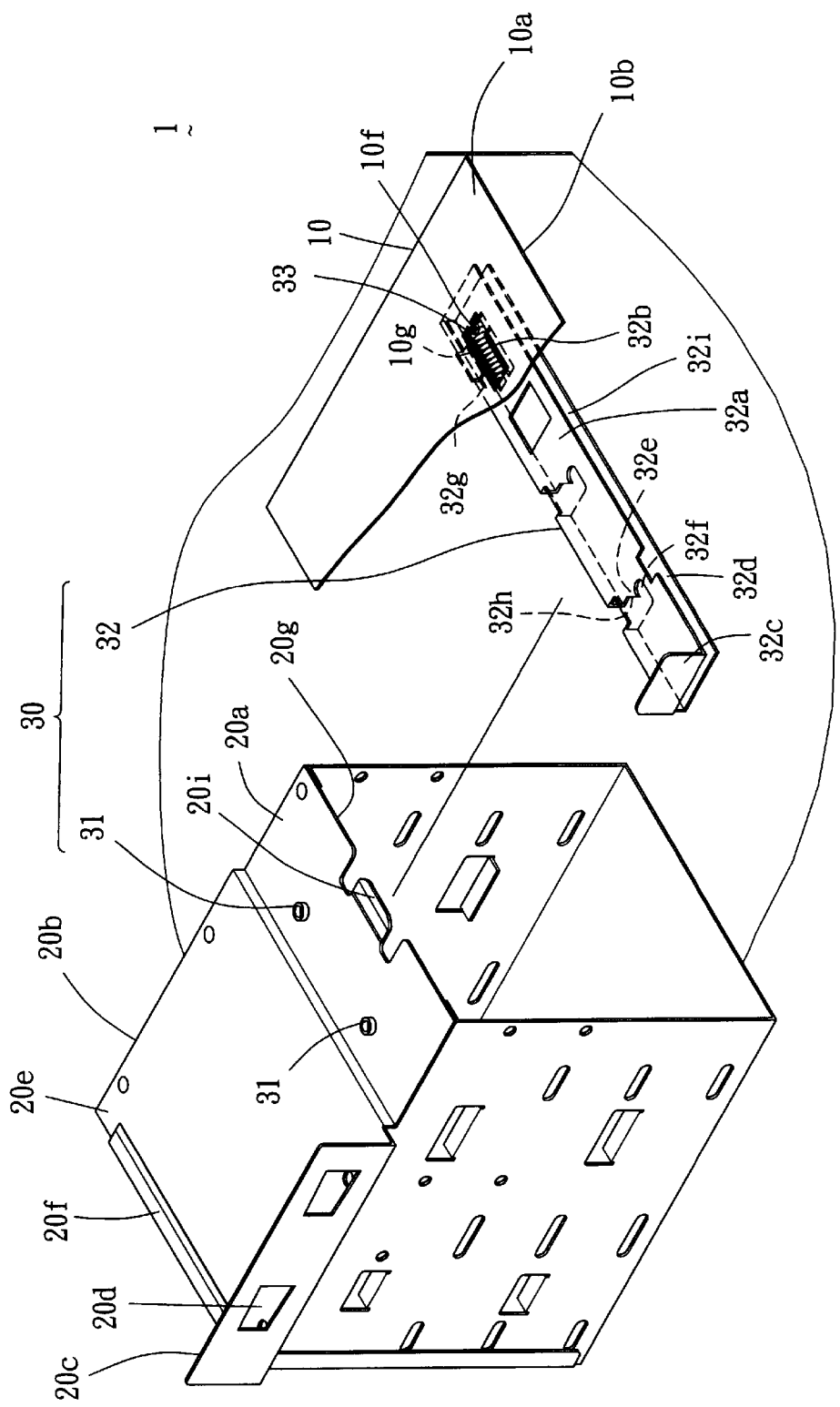
FIG. 2 is an exploded view showing a latch bracket assembly arranged between the built-in cage and an additional cage.

Referring to FIG. 2, an additional cage 20 for receiving a plurality of peripherals (not shown) therein forms an upper wall 20a having a raised plateau 20b thereon. The raised plateau 20b includes a flange 20c extending vertically from a side (not labeled) thereof. The flange 20c defines at least an opening 20d thereon for aligning with a side wall of the built-in cage 10 (not shown). The rear edge 20e of the plateau 20b forms a retaining flap 20f for releasably engaging with the rear edge 10c of the built-in cage 10. A front edge 20g of the upper wall 20a forms a retaining tab 20i for firmly engaging with the retaining lug 10d of the built-in cage 10 when the additional cage 20 is assembled to the.

A latch bracket assembly 30 movably arranged between the built-in cage 10 and the additional cage 20 for selectively retaining the additional cage 20 to the built-in cage 10, includes at least a retaining dowel 31 integrally formed on the upper wall 20a of the additional cage 20, and a latch bracket 32 movably assembled to the bottom wall 10a of the built-in cage 10.

Figure 3:
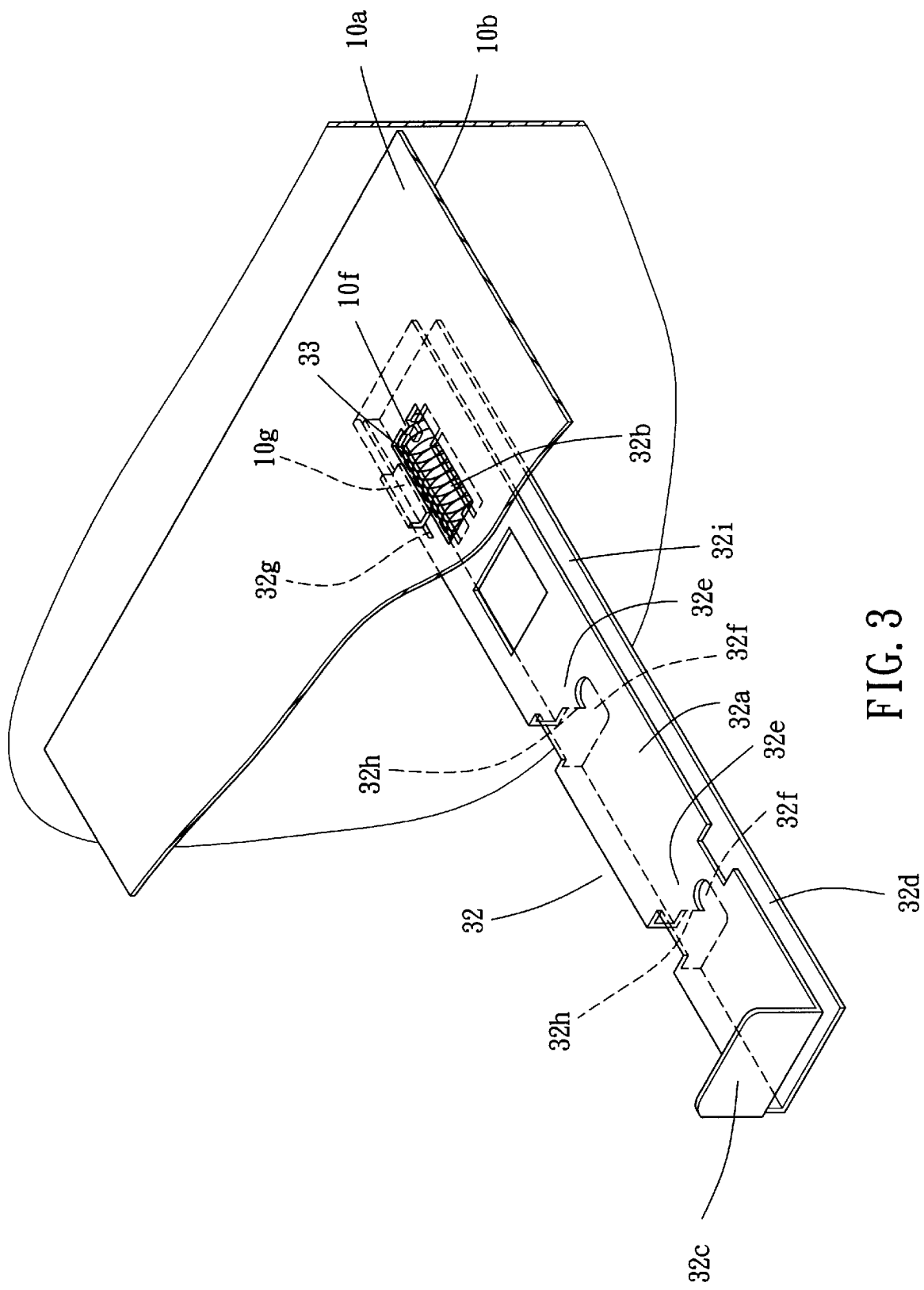
FIG. 3 is a perspective view of a latch bracket of FIG. 2.

As shown in FIGS. 2 and 3, the latch bracket 32 includes a first flat 32a forming a spring cell 32b for receiving a spring 33 disposed between the bottom wall 10a and the latch bracket 32. The bottom wall 10a forms a seat 10f for supporting an end of the spring 33. A pushing tab 32c extends vertically from a traverse end of the first flat 32a. The latch bracket 32 further includes a second flat 32d cantilevered from a side of the first flat 32a. The second flat 32d includes at least a cutout 32e forming an engaging recess 32f for releasably limiting the retaining dowel 31 therein. A guiding surface 32h is formed adjacent to the cutout 32e.

The latch bracket 32 is movably assembled to the bottom wall 10a of the built-in cage 10 by means of a pair of supporting lugs 10g (only one shown) integrally formed on the bottom wall 10a of the built-in cage 10. The latch bracket 32 includes a mounting slot 32g for movably supported on the supporting lug 32g. A gap 32i is defined between the first and second flats 32a and 32d for movably supported by another supporting lug 10g (not shown). By this arrangement, the latch bracket 32 can be selectively positioned between a first position wherein the spring 33 fully extends, and a second position wherein the spring 33 is compressed when an external force is applied to the pushing tab 32c.

Figure 4A:
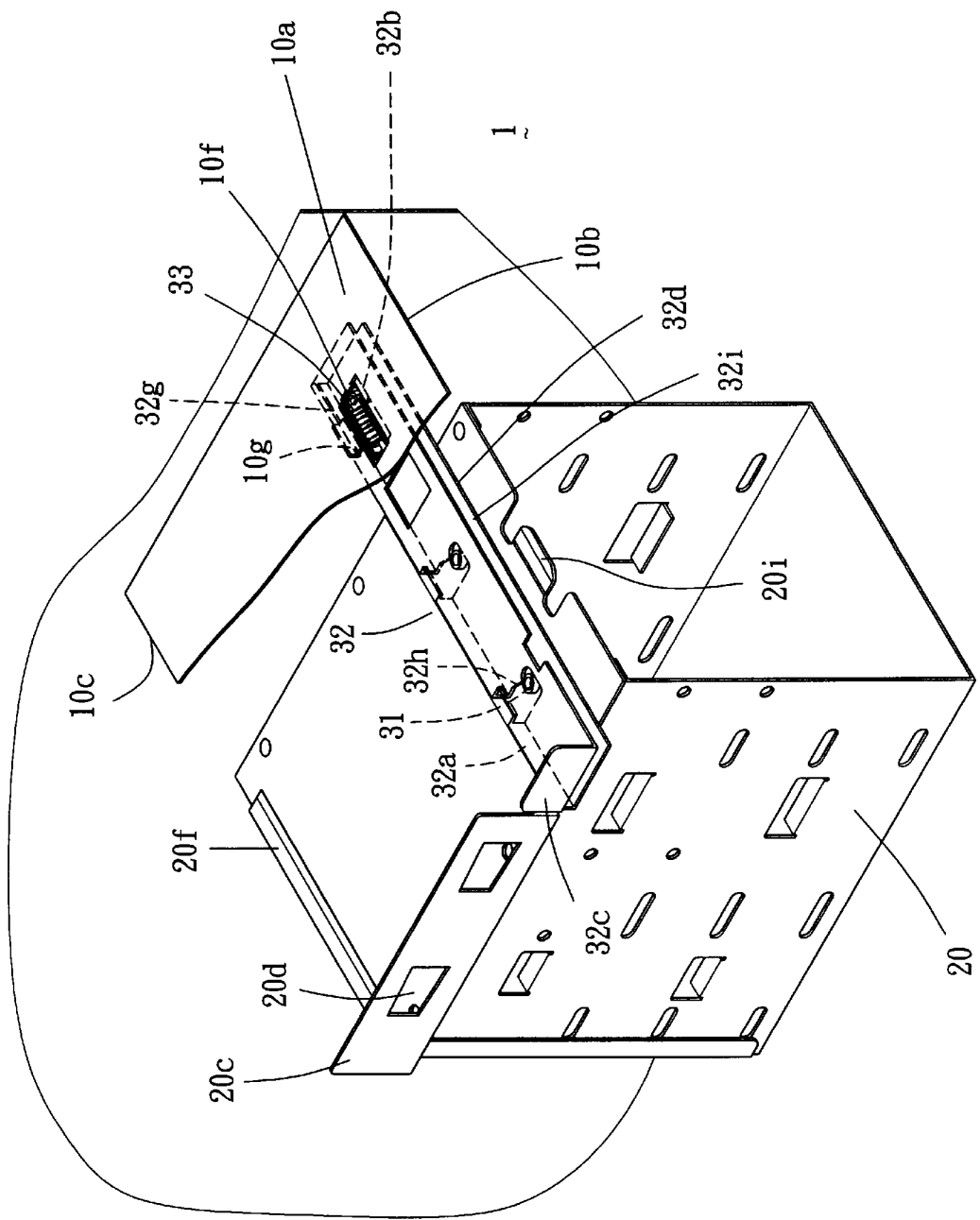
FIGS. 4A and 4B are schematic illustrations showing the disengagement and engagement between the latch bracket and a retaining dowel formed on the additional cage.
Figure 4B:
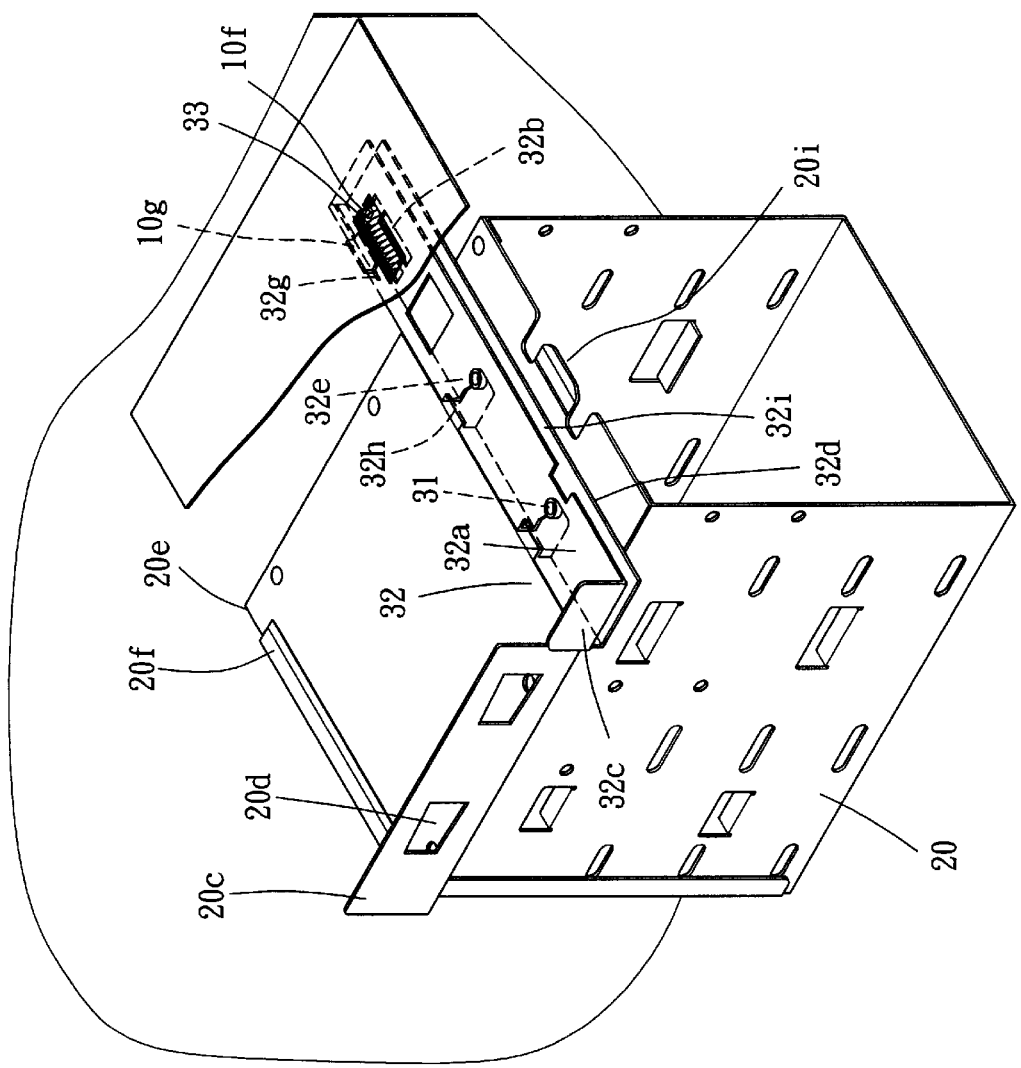

Referring to FIGS. 4A and 4B, after the latch bracket 32 is movably attached to the bottom wall 10a of the built-in cage 10, the additional cage 20 can be attached thereto. When the additional cage 20 is attached to the bottom wall 10a of the built-in cage 10, the retaining tab 20i and the retaining flap 20f engage with the retaining lug 10d and the rear edge 10c, respectively. Meanwhile, the retaining dowel 31 contacts the guiding surface 32h. When the additional cage 20 is moved continuously, the latch bracket 32 is pushed whereby the spring 33 is compressed. After the retaining dowel 31 slides over a peak (not labeled) of the cutout 32e, the retaining dowel 31 will be received in the engaging recess 32f, as shown in FIG. 4B. In this case, the spring 33 is extended whereby the retaining dowel 31 is retained by the engaging recess 32e.

When the retaining dowel 31 is retained by the engaging recess 32f, the longitudinal movement that is orthogonal to the latch bracket 32 is limited and the additional cage 20 is fixedly attached to the bottom wall 10a of the built-in cage 10. When the additional cage 20 is to be removed therefrom, the latch bracket 32 can be pushed inward whereby the retaining dowel 31 is released from the engaging recess 32f. The additional cage 20 can then be moved backward to disengage the retaining tab 20i and the retaining flap 20f from the retaining lugs 10d and 10c, respectively, and the additional cage 20 can then be removed therefrom.

Referring to FIG. 5, the computer housing 1 includes side panels 40a, 40b, a front bezel 40c, and a bay barrier 40d removably assembled thereto. It can be clearly seen that additional cage 20 can be removably assemble to the bottom wall 10a of the built-in cage 10 by means of the latch bracket 32. As a result, the assembly and disassembly can be conveniently achieved.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

We claim:

1. A cage assembly defining a plurality of bays for mounting peripherals therein, comprising:

a built-in cage fixedly secured to a computer housing, said built-in cage including a bottom face having front and rear edges thereon, at least a retaining lug formed at one of said front and rear edges;

an additional cage removably and supportably assembled to said bottom face of said built-in cage, said additional cage forming at least a retaining flap for detachably engaging with one of said first and rear edges, and a retaining tab for retention with said retaining lug of said built-in cage; and a latch bracket assembly arranged between said built-in and additional cages, including a latch bracket movably assembled to said bottom face of said built-in cage and a retaining dowel integrally formed on said upper face of said additional cage, said latch bracket being selectively moved between a first position in which said retaining dowel is securely locked, and a second position in which said retaining dowel is released therefrom;

wherein said latch bracket comprises a first flat forming a spring cell having a spring received therein, said spring being disposed between said bottom face of said built-in cage and said latch bracket said bottom wall forming a seat for supporting an end of said spring.

2. A cage assembly as recited in claim 1, wherein a pushing tab extends vertically from a traverse end of said first flat, said latch bracket further including a second flat cantilevered from a side of said first flat, said second flat including at least a cutout forming an engaging recess for releasably receiving said retaining dowel therein, said cutout forming a guiding surface adjacent to said engaging recess.

3. A computer enclosure, comprising:

a housing having a built-in cage attached thereto, said built-in cage having a face forming a front edge and a rear edge, said front edge forming a retaining lug thereof;

an additional cage having a retaining flap integrally formed at an upper surface thereof for detachably attaching to said rear edge and a retaining tab integrally formed for being detachably engaged with said retaining lug of said built-in cage, at least a retaining dowel located to said upper surface; and a latch bracket movably attached to said surface of said built-in cage for selectively engaging said retaining dowel of said additional cage;

wherein said latch bracket comprises a first flat forming a spring cell having a spring received therein, said spring being disposed between said bottom face of said built-in cage and said latch bracket, said bottom wall forming a seat for supporting an end of said spring;

wherein a pushing tab extends vertically from a traverse end of said first flat, said latch bracket further including a second flat cantilevered from a side of said first flat, said second flat including at least a cutout forming an engaging recess for releasably receiving said retaining dowel therein, said cutout forming a guiding surface adjacent to said engaging recess.

* * * * *